US012735579B2

(12) United States Patent
Nakanishi et al.

(10) Patent No.: US 12,735,579 B2
(45) **Date of Patent: *Sep. 15, 2026**

(54) POWDER COMPOSITION, COATING FILM, AND THREE-DIMENSIONAL SHAPED ARTICLE

(71) Applicant: DAIKIN INDUSTRIES, LTD., Osaka (JP)

(72) Inventors: Koji Nakanishi, Osaka (JP); Toyomitsu Seki, Osaka (JP); Takuma Maruhashi, Osaka (JP); Noriko Imada, Osaka (JP); Hideki Kono, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 683 days.

This patent is subject to a terminal disclaimer.

(21) Appl. No.: 18/191,484

(22) Filed: Mar. 28, 2023

(65) Prior Publication Data

US 2023/0235182 A1 Jul. 27, 2023

Related U.S. Application Data

(63) Continuation of application No. PCT/JP2021/035153, filed on Sep. 24, 2021.

(30) Foreign Application Priority Data

Sep. 30, 2020 (JP) ................................ 2020-165522

(51) Int. Cl.

| | |
|---|---|
| ***C09D 5/03*** | (2006.01) |
| ***B33Y 70/00*** | (2020.01) |
| ***C08K 7/02*** | (2006.01) |
| ***C08L 27/12*** | (2006.01) |
| ***C08L 71/10*** | (2006.01) |
| ***C09D 7/40*** | (2018.01) |
| ***C09D 127/12*** | (2006.01) |
| ***C09D 127/18*** | (2006.01) |
| ***C09D 171/10*** | (2006.01) |
| ***C09D 171/12*** | (2006.01) |

(52) U.S. Cl.

CPC .............. *C09D 5/031* (2013.01); *B33Y 70/00* (2014.12); *C08K 7/02* (2013.01); *C08L 27/12* (2013.01); *C09D 5/03* (2013.01); *C09D 5/033* (2013.01); *C09D 7/70* (2018.01); *C09D 127/12* (2013.01); *C09D 127/18* (2013.01); *C09D 171/10* (2013.01); *C09D 171/12* (2013.01); *C08G 2650/40* (2013.01); *C08L 71/10* (2013.01); *Y02P 10/25* (2015.11)

(58) Field of Classification Search

CPC ...... C09D 5/031; C09D 5/033; C09D 127/12; C09D 171/12; C09D 127/18; C09D 5/03; C09D 171/10; C09D 7/70; B33Y 70/00; C08G 2650/40; Y02P 10/25; C08L 71/10; C08L 27/12; C08K 7/02

See application file for complete search history.

(56) References Cited

U.S. PATENT DOCUMENTS

| | | | | |
|---|---|---|---|---|
| 4,578,427 | A | 3/1986 | Saito et al. | |
| 10,294,362 | B2 | 5/2019 | Ueda et al. | |
| 10,964,444 | B2 | 3/2021 | Ueda et al. | |
| 11,024,441 | B2 | 6/2021 | Masuda et al. | |
| 12,448,514 | B2 * | 10/2025 | Nakanishi | C08L 27/18 |
| 2004/0253387 | A1 | 12/2004 | Cavero | |
| 2006/0110601 | A1 * | 5/2006 | Hennessey | B05D 5/083 427/180 |
| 2014/0329087 | A1 | 11/2014 | Masuda et al. | |
| 2014/0329968 | A1 | 11/2014 | Masuda et al. | |
| 2015/0203712 | A1 | 7/2015 | Gopalakrishnan | |
| 2015/0259525 | A1 | 9/2015 | Mutsuda et al. | |
| 2015/0313959 | A1 | 11/2015 | Kissel et al. | |
| 2017/0301430 | A1 | 10/2017 | Iida et al. | |
| 2018/0001520 | A1 | 1/2018 | Saito et al. | |
| 2018/0354182 | A1 | 12/2018 | Miyake | |
| 2019/0127500 | A1 | 5/2019 | Liu et al. | |
| 2020/0123377 | A1 | 4/2020 | Nakanishi et al. | |
| 2020/0131385 | A1 | 4/2020 | Bartow et al. | |

(Continued)

FOREIGN PATENT DOCUMENTS

| | | | |
|---|---|---|---|
| CN | 110225814 | A | 9/2019 |
| CN | 110799593 | A | 2/2020 |

(Continued)

OTHER PUBLICATIONS

International Preliminary Report on Patentability dated Mar. 28, 2023 with a Translation of the Written Opinion of the International Searching Authority in Application No. PCT/JP2021/035144.

International Preliminary Report on Patentability dated Mar. 28, 2023 with a Translation of the Written Opinion of the International Searching Authority in Application No. PCT/JP2021/035149.

International Preliminary Report on Patentability dated Mar. 28, 2023 with a Translation of the Written Opinion of the International Searching Authority in Application No. PCT/JP2021/035153.

Extended European Search Report dated Nov. 14, 2024, issued in corresponding European Application No. 21875446.3.

(Continued)

*Primary Examiner* — Randy P Gulakowski

*Assistant Examiner* — Virginia L Stonehocker

(74) *Attorney, Agent, or Firm* — Sughrue Mion, PLLC

(57) ABSTRACT

A powder composition containing an aromatic polyetherketone resin (I) and a fluorine-containing copolymer (II). The powder composition has a ratio r2/r1 of 1.60 or lower, wherein r1 represents an average dispersed particle size of the fluorine-containing copolymer (II) and r2 represents an average dispersed particle size of the fluorine-containing copolymer (II) after melt flow rate measurement at 380° C. and a load of 5000 g with 5-minute pre-heating in conformity with ASTM D1238.

7 Claims, No Drawings

(56) References Cited

U.S. PATENT DOCUMENTS

| | | | |
|---|---|---|---|
| 2021/0130604 | A1 | 5/2021 | Ramakrishnan et al. |
| 2022/0106475 | A1 | 4/2022 | Itami et al. |
| 2023/0174780 | A1 | 6/2023 | Seki et al. |
| 2023/0242771 | A1 | 8/2023 | Nakanishi et al. |
| 2023/0260672 | A1 | 8/2023 | Maruhashi et al. |

FOREIGN PATENT DOCUMENTS

| | | | |
|---|---|---|---|
| CN | 116057113 | A | 5/2023 |
| EP | 2 592 116 | A1 | 5/2013 |
| EP | 2 881 430 | A1 | 6/2015 |
| EP | 3 026 083 | A1 | 6/2016 |
| EP | 3 950 825 | A1 | 2/2022 |
| JP | 60-155275 | A | 8/1985 |
| JP | 63-286458 | A | 11/1988 |
| JP | 2006-527074 | A | 11/2006 |
| JP | 2016-79391 | A | 5/2016 |
| JP | 2017-217881 | A | 12/2017 |
| JP | 2018-2908 | A | 1/2018 |
| JP | 2019-48860 | A | 3/2019 |
| JP | 2019-511616 | A | 4/2019 |
| JP | 2020-526428 | A | 8/2020 |
| WO | 2004/108842 | A1 | 12/2004 |
| WO | 2013/088968 | A1 | 6/2013 |
| WO | 2014/034493 | A1 | 3/2014 |
| WO | 2016/056431 | A1 | 4/2016 |
| WO | 2017/149896 | A1 | 9/2017 |
| WO | 2019/081143 | A1 | 5/2019 |
| WO | 2019/155977 | A1 | 8/2019 |
| WO | 2020/196243 | A1 | 10/2020 |

OTHER PUBLICATIONS

Extended European Search Report dated Sep. 24, 2024, issued in European Application No. 21875441.4.

Extended European Search Report dated Oct. 1, 2024, issued in European Application No. 21875444.8.

Non-Final Office Action issued May 7, 2025 in U.S. Appl. No. 18/191,341.

International Search Report dated Nov. 16, 2021 issued in Application No. PCT/JP2021/035149.

International Search Report dated Nov. 9, 2021 issued in Application No. PCT/JP2021/035153.

International Search Report dated Oct. 26, 2021 issued in Application No. PCT/JP2021/035144.

Hirokazu Komori et al., "Fluoropolymer PFA for powder bed fusion (under development)", Material Stage, vol. 20, No. 4, 2020, pp. 37-40 (7 pages total).

US Office Action dated Feb. 17, 2026, issued in related U.S. Appl. No. 18/191,519.

* cited by examiner

POWDER COMPOSITION, COATING FILM, AND THREE-DIMENSIONAL SHAPED ARTICLE

This application is a Rule 53(b) Continuation of International Application No. PCT/JP2021/035153 filed Sep. 24, 2021, claiming priority based on Japanese Patent Application No. 2020-165522 filed Sep. 30, 2020, the respective disclosures of which all of the above are incorporated herein by reference in their entirety.

TECHNICAL FIELD

The disclosure relates to powder compositions, coating films, and three-dimensionally printed articles.

BACKGROUND ART

Fluorine-containing copolymers have excellent properties including slidability, heat resistance, chemical resistance, solvent resistance, weather resistance, flexibility, and electrical properties. Powder containing a fluorine-containing copolymer therefore is used as a powder coating material or the like in various products.

Patent Literature 1, for example, discloses a process for coating a substrate with a coating containing a fluoropolymer, the process including the sequential steps of: a) preparing a solid mixture containing one or more fluoropolymers and one or more thermoplastic polymers thermally stable at temperatures in excess of 400° C.; b) melt blending and extruding the solid mixture at a temperature of from about 250° C. to about 400° C. to achieve homogeneity; and c) subjecting the extrudate to a mechanical means to obtain a powder up to about 100 microns average particle size.

CITATION LIST

Patent Literature

Patent Literature 1: JP 2006-527074 T

SUMMARY

The disclosure relates to a powder composition containing an aromatic polyetherketone resin (I) and a fluorine-containing copolymer (II) (hereinafter also referred to as the "powder composition of the disclosure").

Advantageous Effects

The powder composition of the disclosure having the above structure can produce coating films and molded articles that are excellent in impact resistance and slidability.

DESCRIPTION OF EMBODIMENTS

The powder composition of the disclosure contains an aromatic polyetherketone resin (I) and a fluorine-containing copolymer (II). In the powder composition of the disclosure, the fluorine-containing copolymer (II) is preferably dispersed in the form of particles in the aromatic polyetherketone resin (I). In such a case, normally, the aromatic polyetherketone resin (I) forms a continuous phase, and the fluorine-containing copolymer (II) forms a dispersed phase.

Use of the aromatic polyetherketone resin (I) allows the powder composition to be excellent in impact resistance and slidability and to be easy to mold. The use also allows a coating film or a molded article such as a three-dimensionally printed article which are obtainable from the powder composition of the disclosure to have excellent tensile elongation at break, excellent impact resistance, excellent toughness, excellent slidability, and excellently low dielectricity.

The aromatic polyetherketone resin (I) may be any one containing a repeating unit containing an arylene group, an ether group (—O—), and a carbonyl group (—C(=O)—), and may contain, for example, any of the repeating units represented by the following formulas (a1) to (a5):

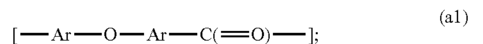 (a1)

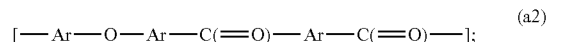 (a2)

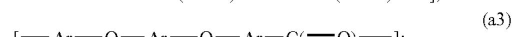 (a3)

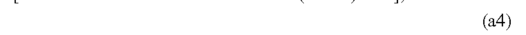 (a4)

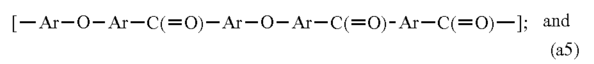 and

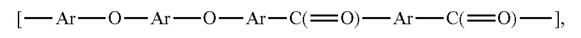 (a5)

wherein Ar is a divalent aromatic hydrocarbon ring group optionally containing a substituent.

Examples of the divalent aromatic hydrocarbon ring group represented by Ar include: C6-C10 arylene groups such as phenylene groups, including an o-, m-, or p-phenylene group, and a naphthylene group; biarylene groups such as biphenylene groups, including a 2,2'-biphenylene group, a 3,3'-biphenylene group, and a 4,4'-biphenylene group, where each arylene group has a carbon number of 6 to 10; and terarylene groups such as an o-, m-, or p-terphenylene group, where each arylene group has a carbon number of 6 to 10. These aromatic hydrocarbon ring groups may have any substituent such as a halogen atom, an alkyl group, e.g., a linear or branched C1-C4 alkyl group such as a methyl group, a haloalkyl group, a hydroxy group, an alkoxy group, e.g., a linear or branched C1-C4 alkoxy group such as a methoxy group, a mercapto group, an alkylthio group, a carboxy group, a sulfo group, an amino group, a N-substituted amino group, or a cyano group. In the repeating units (a1) to (a5), Ar groups may be the same as or different from each other.

Ar is preferably a phenylene group such as a p-phenylene group or a biphenylene group such as a 4,4'-biphenylene group.

An example of a resin containing the repeating unit (a1) is polyetherketone such as "PEEK-HT" available from Victrex. An example of a resin containing the repeating unit (a2) is polyetherketoneketone such as "PEKK" available from Arkema+Oxford Performance Materials. Examples of a resin containing the repeating unit (a3) include polyetheretherketone such as "VICTREX PEEK" available from Victrex, "Vestakeep®" available from Evonik, "Vestakeep-J" available from Daicel-Evonik, and "KetaSpire®" available from Solvay Specialty Polymers, and polyether-diphenyl-ether-phenyl-ketone-phenyl such as "Kadel®" available from Solvay Specialty Polymers. An example of a resin containing the repeating unit (a4) is polyetherketoneetherketoneketone such as "VICTREX ST" available from Victrex. An example of a resin containing the repeating unit (a5) is polyetheretherketoneketone.

In the repeating unit containing an arylene group, an ether group, and a carbonyl group, the ratio (E/K) of an ether segment (E) to a ketone segment (K) may be, for example, 0.5 to 3, preferably about 0.5 to 2.0. The ether segment imparts flexibility to the molecule chain and the ketone segment imparts stiffness to the molecule chain. Thus, the larger the amount of the ether segment is, the higher the crystallization speed tends to be and the higher the crystallinity finally achieved tends to be, while the larger the amount of the ketone segment is, the higher the glass transition temperature tends to be and the higher the melting point tends to be.

One of these aromatic polyetherketone resins (I) may be used alone or two or more thereof may be used in combination.

Preferred among these aromatic polyetherketone resins (I) are aromatic polyetherketone resins containing any of the repeating units (a1) to (a4). For example, the aromatic polyetherketone resin (I) preferably includes at least one resin selected from the group consisting of polyetherketone, polyetheretherketone, polyetherketoneketone, and polyetherketoneetherketoneketone, more preferably at least one resin selected from the group consisting of polyetherketone, polyetheretherketone, and polyetherketoneketone. In order to produce a molded article having much better tensile elongation at break, much better impact resistance, much better toughness, much better slidability, and much lower dielectricity, polyetherketoneketone is particularly preferred.

The aromatic polyetherketone resin (I) preferably has a melting point of 300° C. or higher, more preferably 320° C. or higher. A melting point within this range allows the resulting molded article to have improved heat resistance. The melting point is preferably 380° C. or lower. An aromatic polyetherketone resin having a melting point equal to or higher than 380° C. may cause significant thermal degradation of the fluorine-containing copolymer during kneading, and thus, the physical properties may not be maintained.

The melting point is the temperature corresponding to the maximum value on a heat-of-fusion curve with a temperature-increasing rate of 10° C./min using a differential scanning calorimeter (DSC).

The aromatic polyetherketone resin (I) preferably has a melt flow rate (MFR), which is measured at 380° C. and a 5000-g load, of 1 to 150 g/10 min, more preferably 5 to 130 g/10 min, still more preferably 10 to 100 g/10 min. An MFR within this range allows the resulting molded article to have much better impact resistance and much better tensile elongation.

The MFR of the aromatic polyetherketone resin (I) is measured using a melt indexer in conformity with ASTM D1238.

The aromatic polyetherketone resin (I) preferably has a melt viscosity of 0.01 to 4.0 $kNsm^{-2}$ at 60 $sec^{-1}$ and 390° C. A melt viscosity within this range can lead to improved processibility and allows the resulting molded article such as a three-dimensionally printed article to have excellent tensile strength. The lower limit of the melt viscosity is preferably 0.05 $kNsm^{-2}$, more preferably 0.10 $kNsm^{-2}$, still more preferably 0.15 $kNsm^{-2}$. The upper limit of the melt viscosity is preferably 2.5 $kNsm^{-2}$, more preferably 1.5 $kNsm^{-2}$, still more preferably 1.0 $kNsm^{-2}$.

The melt viscosity of the aromatic polyetherketone resin (I) is measured in conformity with ASTM D3835-02.

The aromatic polyetherketone resin (I) preferably has a glass transition temperature of 130° C. or higher, more preferably 135° C. or higher, still more preferably 140° C. or higher. A glass transition temperature within this range allows the resulting resin composition to have excellent heat resistance. In terms of moldability, the upper limit of the glass transition temperature is preferably, but is not limited to, 220° C. or lower, more preferably 180° C. or lower.

The glass transition temperature is measured in conformity with JIS K7121 using a differential scanning calorimeter (DSC) at a temperature-increasing rate of 20° C./min.

The fluorine-containing copolymer (II) is, for example, a polymer containing at least one polymerized unit based on a fluorine-containing ethylenic monomer. The fluorine-containing copolymer (II) is preferably a melt-fabricable fluororesin (melt-moldable fluororesin). One fluorine-containing copolymer (II) may be used or two or more fluorine-containing copolymers (II) may be used.

Examples of the fluorine-containing copolymer (II) include a tetrafluoroethylene (TFE)/hexafluoropropylene (HFP) copolymer, a TFE/HFP/perfluoro(alkyl vinyl ether) (PAVE) copolymer, a TFE/PAVE copolymer (PFA), an ethylene (Et)/TFE copolymer, an Et/TFE/HFP copolymer, a chlorotrifluoroethylene (CTFE)/TFE copolymer, a CTFE/TFE/PAVE copolymer, an Et/CTFE copolymer, a TFE/vinylidene fluoride (VdF) copolymer, a VdF/HFP/TFE copolymer, and a VdF/HFP copolymer.

The PAVE preferably contains a C1-C6 alkyl group, and examples thereof include perfluoro(methyl vinyl ether), perfluoro(ethyl vinyl ether), perfluoro(propyl vinyl ether), and perfluoro(butyl vinyl ether).

The fluorine-containing copolymer (II) is more preferably a copolymer of tetrafluoroethylene (TFE) and a perfluoroethylenic unsaturated compound represented by the following formula (1):

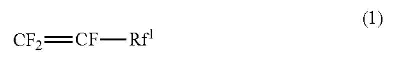

(1)

wherein $Rf^1$ is $—CF_3$ or $—ORf^2$, where $Rf^2$ is a C1-C5 perfluoroalkyl group. When $Rf^1$ is $—ORf^2$, $Rf^2$ is preferably a C1-C3 perfluoroalkyl group. Use of the fluorine-containing copolymer (II) can lead to a molded article having excellent tensile properties, excellent flexibility, excellent impact resistance, excellent slidability, and excellently low dielectricity. The "excellent tensile properties" means that the tensile elongation at break is high.

In order to provide a molded article having much better tensile elongation at break, much better impact resistance, much better flexibility, much better slidability, and much lower dielectricity, the perfluoroethylenic unsaturated compound represented by the formula (1) preferably includes at least one selected from the group consisting of hexafluoropropylene (HFP), perfluoro(methyl vinyl ether) (PMVE), perfluoro(ethyl vinyl ether) (PEVE), and perfluoro(propyl vinyl ether) (PPVE), more preferably at least one selected from the group consisting of hexafluoropropylene and perfluoro(propyl vinyl ether).

The fluorine-containing copolymer (II) still more preferably includes at least one selected from the group consisting of a TFE/HFP copolymer, a TFE/HFP/PPVE copolymer, and a TFE/PPVE copolymer, particularly preferably at least one selected from the group consisting of a TFE/HFP copolymer and a TFE/HFP/PPVE copolymer.

The fluorine-containing copolymer (II) preferably contains 98 to 75% by mass of a polymerized unit based on TFE (TFE unit) and 2 to 25% by mass of a polymerized unit based on a perfluoroethylenic unsaturated compound represented by the formula (1) relative to all polymerized units.

The lower limit of the amount of TFE defining the fluorine-containing copolymer (II) is more preferably 77% by mass, still more preferably 80% by mass, particularly preferably 83% by mass, more particularly preferably 85% by mass. The upper limit of the amount of TFE defining the fluorine-containing copolymer (II) is more preferably 97% by mass, still more preferably 95% by mass, particularly preferably 92% by mass.

The lower limit of the amount of the perfluoroethylenic unsaturated compound represented by the formula (1) defining the fluorine-containing copolymer (II) is more preferably 3% by mass, still more preferably 5% by mass. The upper limit of the amount of the perfluoroethylenic unsaturated compound represented by the formula (1) defining the fluorine-containing copolymer (II) is more preferably 23% by mass, still more preferably 20% by mass, particularly preferably 17% by mass, more particularly preferably 15% by mass.

The fluorine-containing copolymer (II) is preferably a copolymer consisting of TFE and a perfluoroethylenic compound represented by the formula (1).

The fluorine-containing copolymer (II) preferably has a melt viscosity of 0.2 to 4.0 $kNsm^{-2}$ at 60 $sec^{-1}$ and 390° C. A melt viscosity within this range can lead to improved processibility and allows the resulting molded article to have excellent tensile elongation at break, excellent impact resistance, excellent toughness, excellent flexibility, excellent slidability, and excellently low dielectricity. The lower limit of the melt viscosity is more preferably 0.25 $kNsm^{-2}$, still more preferably 0.3 $kNsm^{-2}$ particularly preferably 0.35 $kNsm^{-2}$, most preferably 0.4 $kNsm^{2}$. The upper limit of the melt viscosity is more preferably 3.7 $kNsm^{-2}$, still more preferably 3.6 $kNsm^{-2}$, particularly preferably 3.5 $kNsm^{-2}$.

The melt viscosity of the fluorine-containing copolymer (II) is measured in conformity with ASTM D3835-02.

The fluorine-containing copolymer (II) preferably has a melt flow rate (MFR), which is measured at 380° C. and a 5000-g load, of 0.1 to 100 g/10 min, more preferably 0.5 to 80 g/10 min, still more preferably 0.5 to 70 g/10 min. An MFR within this range allows the resulting molded article to have much better tensile elongation at break, much better impact resistance, much better toughness, much better flexibility, much better slidability, and much lower dielectricity.

The MFR of the fluorine-containing copolymer (II) is measured using a melt indexer in conformity with ASTM D1238.

The melting point of the fluorine-containing copolymer (II) is preferably, but is not limited to, equal to or lower than the melting point of the aromatic polyetherketone resin (I) because the fluorine-containing copolymer (II) has preferably already been in a molten state at a temperature where the aromatic polyetherketone resin (I) used in the molding melts. For example, the melting point of the fluorine-containing copolymer (II) is preferably 200° C. to 323° C., more preferably 220° C. to 320° C., still more preferably 240° C. to 315° C. The melting point of the fluororesin (II) is the temperature corresponding to the maximum value on a heat-of-fusion curve with a temperature-increasing rate of 10° C./min using a differential scanning calorimeter (DSC).

The fluorine-containing copolymer (II) may be treated with fluorine gas or ammonia by a known method in advance.

Preferably, the powder composition of the disclosure satisfies a ratio r2/r1 of 1.60 or lower, wherein r1 represents the average dispersed particle size of the fluorine-containing copolymer (II) and r2 represents the average dispersed particle size of the fluorine-containing copolymer (II) after melt flow rate (MFR) measurement at 380° C. and a 5000-g load with 5-minute pre-heating in conformity with ASTM D1238.

The fluorine-containing copolymer is difficult to mix with other resins. A resin composition containing the fluorine-containing copolymer therefore are likely to suffer surface peeling during molding, which makes it difficult to develop mechanical properties. The disclosers made intensive studies to solve the above problem to focus on the shear rate during kneading. They found out that effective application of shear during kneading can lead to production of a composition that can reduce agglomeration or coalescing of fluorine-containing copolymer particles even under heating.

The powder composition of the disclosure having the above structure produces coating films and three-dimensionally printed articles having better impact resistance, better slidability, and better tensile properties than coating films and three-dimensionally printed articles produced using an aromatic polyetherketone resin alone.

The r1 represents the average dispersed particle size of the fluorine-containing copolymer (II) in the powder composition of the disclosure. The r2 represents the average dispersed particle size of the fluorine-containing copolymer (II) in a resin composition resulting from melt flow rate measurement of the powder composition of the disclosure at 380° C. and a 5000-g load with 5-minute pre-heating in conformity with ASTM D1238.

The ratio r2/r1 is preferably 1.60 or lower. In order to achieve much better tensile elongation at break, much better impact resistance, much better toughness, much better slidability, and much lower dielectricity, the ratio r2/r1 is more preferably 1.50 or lower, still more preferably 1.47 or lower. The lower limit of the ratio r2/r1 is not limited, but may be 0.80, 0.90, 1.00, 1.10, or 1.20.

The ratio r2/r1 becomes high as dispersed particles of the fluorine-containing copolymer (II) agglomerate in the MFR measurement to form coarse particles of the fluorine-containing copolymer (II). Thus, a ratio r2/r1 of 1.60 or lower indicates that the particles of the fluorine-containing copolymer (II) less easily agglomerate in the MFR measurement.

In the powder composition of the disclosure, the fluorine-containing copolymer (II) preferably has average dispersed particle sizes (r1, r2) of 2.5 μm or smaller. Average dispersed particle sizes of 2.5 μm or smaller can lead to the production of a molded article having much better tensile elongation at break, much better impact resistance, much better slidability, and much lower dielectricity.

In order to provide a molded article having much better properties and to achieve much better moldability, the average dispersed particle sizes of the fluorine-containing copolymer (II) are more preferably 2.0 μm or smaller, still more preferably 1.5 μm or smaller. The lower limit of the average dispersed particle sizes may be, but is not limited to, 0.01 μm.

In one embodiment of the disclosure, r1 and r2 of the fluorine-containing copolymer (II) satisfy r2 r1.

In the powder composition of the disclosure, the fluorine-containing copolymer (II) preferably has a maximum dispersed particle size of 5 μm or smaller. A maximum dispersed particle size of 5 μm or smaller can lead to improvement in tensile elongation at break, impact resistance, toughness, flexibility, and low dielectricity. A maximum dispersed particle size of 3 μm or smaller can lead to the production of a molded article having much better tensile elongation at break, much better impact resistance, much better toughness, much better flexibility, and much lower dielectricity. The lower limit of the maximum dispersed particle size may be, but is not limited to, 0.01 μm.

The average dispersed particle sizes and the maximum dispersed particle size of the fluorine-containing copolymer (II) in the powder composition of the disclosure are determined by the following procedure.

The average dispersed particle sizes of the fluorine-containing copolymer in the powder composition can be observed by the following operations. The powder composition is embedded in an epoxy resin, followed by cutting of the epoxy resin with a microtome. The obtained cross section is observed using a confocal laser microscope. The resulting micrograph is analyzed using image analysis software (Image J). The dispersed phases are selected and the equivalent circle diameters are determined. Equivalent circle diameters of 20 dispersed phases are calculated and averaged to determine each average dispersed particle size.

In order to reduce agglomeration and coalescence of the fluorine-containing copolymer phase and to easily control the rate of change of the dispersed particle size within a desired range in the powder composition of the disclosure, a fluorine-containing copolymer containing a reactive functional group may be used. Specific examples of the reactive functional group include, but are not limited to, a vinyl group, an epoxy group, a carboxy group, an acid anhydride group, an ester group, an aldehyde group, a carbonate group, a carbonyldioxy group, a haloformyl group, an alkoxycarbonyl group, an amino group, a hydroxy group, a styryl group, a methacrylic group, an acrylic group, a ureido group, a mercapto group, a sulfide group, an isocyanate group, and a hydrolyzable silyl group. Preferred among these is at least one selected from the group consisting of an epoxy group, a carboxy group, an alkoxycarbonyl group, a haloformyl group, an acid anhydride group, an amino group, and a hydroxy group, more preferred is at least one selected from the group consisting of a carboxy group and an acid anhydride group. The fluorine-containing copolymer may contain two or more of these reactive functional groups. The reactive functional group(s) may be introduced into either a main chain end or a side chain of the fluorine-containing copolymer.

The functional group content in the fluorine-containing copolymer containing a reactive functional group is preferably, but is not limited to, within a range from 0.01 mol % to 15 mol % in consideration of sufficient progress of the reaction and deterioration of the fluidity.

In the powder composition of the disclosure, the aromatic polyetherketone resin (I) and the fluorine-containing copolymer (II) preferably have a melt viscosity ratio (I)/(II) (aromatic polyetherketone resin (I)/fluorine-containing copolymer (II)) of 0.01 to 5.0. A melt viscosity ratio (I)/(II) within this range allows the resulting molded article to have much better tensile elongation at break, much better impact resistance, much better toughness, much better slidability, and much lower dielectricity. The lower limit of the melt viscosity ratio (I)/(II) is more preferably 0.02, still more preferably 0.025, particularly preferably 0.03. The upper limit of the melt viscosity ratio (I)/(II) is more preferably 4.0, still more preferably 3.0, particularly preferably 2.5, more particularly preferably 2.0, most preferably 1.8.

In the powder composition of the disclosure, the ratio by mass (I):(II) of the aromatic polyetherketone resin (I) to the fluorine-containing copolymer (II) is preferably, but is not limited to, 99:1 to 30:70, for example. The ratio by mass is more preferably 95:5 to 35:65, still more preferably 95:5 to 40:60.

The powder composition of the disclosure preferably has a melt flow rate (MFR) at 380° C. of 0.1 to 100 g/10 min, more preferably 1 to 80 g/10 min. A powder composition having an MFR within the above range has much better fluidity. A powder composition having an MFR smaller than the above range has poor moldability, possibly failing to provide a smooth coating film or a three-dimensionally printed article showing good mechanical properties. A powder composition having an MFR greater than the above range may fail to exhibit desired properties. The MFR is a value measured at 380° C. and a 5000-g load with 5-minute pre-heating in conformity with ASTM D1238.

The powder composition of the disclosure preferably has a relative permittivity of 2.60 or lower, more preferably 2.58 or lower, still more preferably 2.55 or lower. A relative permittivity lower than this range allows the resulting resin composition to have a small dielectric loss which has been difficult to achieve. The lower limit of the relative permittivity is more preferably, but is not limited to, 2.30 or higher. In the case where the proportion of the fluorine-containing copolymer is high such that the relative permittivity is approximately lower than 2.30, the resulting mechanical properties are significantly poor and desired mechanical properties are difficult to achieve.

The dielectric constant is a value measured by a cavity resonator perturbation method (6 GHz).

In one preferred embodiment, the powder composition of the disclosure satisfies a ratio r2/r1 of 1.60 or lower, wherein r1 represents the average dispersed particle size of the fluorine-containing copolymer (II) and r2 represents the average dispersed particle size of the fluorine-containing copolymer (II) after melt flow rate measurement at 380° C. and a 5000-g load with 5-minute pre-heating, and the aromatic polyetherketone resin (I) is PEKK.

The powder composition of the disclosure may further contain an optional component other than the aromatic polyetherketone resin (I) and the fluorine-containing copolymer (II). Examples of the optional component other than the aromatic polyetherketone resin (I) and the fluorine-containing copolymer (II) include, but are not limited to, fibrous reinforcements such as whiskers of, e.g., potassium titanate, glass fiber, asbestos fiber, carbon fiber, ceramic fiber, potassium titanate fiber, aramid fiber, carbon nanotube, cellulose nanofiber, and other high-strength fibers; inorganic fillers such as talc, mica, clay, carbon powder, graphite, artificial graphite, natural graphite, graphene, and glass beads; colorants; commonly used inorganic or organic fillers such as flame retarders; lubricants such as silicone oil and molybdenum disulfide; pigments; conducting agents such as carbon black; impact resistance improvers such as rubber; glidants such as magnesium stearate; ultraviolet absorbers such as benzotriazole compounds; foaming agents such as boron nitride; crystal nucleating agents such as phosphate esters and their salts, and phosphate ester complex compounds; and other additives.

These additives in amounts that do not impair the effects of the disclosure may be added to the aromatic polyetherketone resin (I) that serves as a material or to the fluorine-containing copolymer (II) that serves as a material. Also, these additives in amounts that do not impair the effects of the disclosure may be added to the materials in a molten state in, for example, a side feeding manner upon kneading of the aromatic polyetherketone resin (I) and the fluorine-containing copolymer (II).

(III) Fibrous Filler

The powder composition of the disclosure preferably further contains a fibrous filler (III) as an additive. Examples of the fibrous filler used in the powder composition of the disclosure include fibrous inorganic fillers such as glass fiber, carbon fiber, carbon milled fiber, metal fiber, asbestos, rock wool, ceramic fiber, slag fiber, potassium titanate whisker, boron whisker, aluminum borate whisker, calcium carbonate whisker, titanium oxide whisker, wollastonite, xonotlite, palygorskite (attapulgite), and sepiolite; heat-resistant fibrous organic fillers typified by heat-resistant organic fibers, such as aramid fiber, polyimide fiber, and polybenzothiazole fiber; and fibrous fillers prepared by coating the surfaces of these fillers with a different material such as a metal or a metal oxide. Examples of the fillers prepared by coating the surfaces of the listed fillers with a different material include metal-coated glass fiber and metal-coated carbon fiber. Examples of methods for coating the surfaces with a different material include, but are not limited to, known plating processes such as electrolytic plating, electroless plating, and melt plating; vacuum deposition; ion plating; CVD processes such as thermal CVD, MOCVD, and plasma CVD; a PVD process; and sputtering. Preferred among these fibrous fillers is at least one selected from the group consisting of glass fiber, carbon fiber, carbon milled fiber, and aramid fiber, more preferred is at least one selected from the group consisting of glass fiber and carbon fiber.

The fibrous filler (III) preferably has a fiber diameter ranging from 0.1 to 20 μm. The upper limit of the fiber diameter is more preferably 18 μm, still more preferably 15 μm. The lower limit of the fiber diameter is more preferably 1 μm, still more preferably 6 μm. The fiber diameter refers to the number average fiber diameter. The number average fiber diameter is a value calculated from scanning electron microscopic images of residues collected after the molded article is dissolved in a solvent or after the resin is decomposed with a basic compound and ash residues collected after the molded article is burned into ashes in a crucible.

In the case where the fibrous filler used in the powder composition of the disclosure is glass fiber, the glass fiber may have any of a variety of glass compositions such as compositions of A-glass, C-glass, and E-glass. Such glass filler may optionally contain components such as $TiO_2$, $SO_3$, and $P_2O_5$. More preferred among these is E-glass (alkali-free glass). The glass fiber is preferably surface-treated with a known surface-treating agent such as a silane coupling agent, a titanate coupling agent, or an aluminate coupling agent in order to achieve improved mechanical strength. Also, the glass fiber is preferably bundled with a resin such as an olefinic resin, a styrenic resin, an acrylic resin, a polyester resin, an epoxy resin, or a urethane resin, particularly preferably with an epoxy resin or a urethane resin in order to achieve increased mechanical strength. The amount of a sizing agent attached to the bundled glass fiber is preferably 0.1 to 3% by mass, more preferably 0.2 to 1% by mass in 100% by mass of the glass fiber. The fibrous filler used in the powder composition of the disclosure may be glass fiber having a flat cross section. For the glass fiber having a flat cross section, the fiber cross section preferably has an average major axis of 10 to 50 μm, more preferably 15 to 40 μm, still more preferably 20 to 35 μm, and preferably has an average ratio of the major axis to the minor axis (major axis/minor axis) of 1.5 to 8, more preferably 2 to 6, still more preferably 2.5 to 5. Use of a glass fiber having a flat cross section with an average ratio of the major axis to the minor axis falling within this range leads to greater improvement in anisotropy than use of fiber having a non-circular cross section with an average ratio of lower than 1.5. Examples of the shape of the flat cross section include not only a flat shape but also an elliptical shape, an eye-brow shape, a trefoil shape, and a non-circular shape similar to any of these shapes. In order to improve mechanical strength and low anisotropy, a flat shape is preferred among these. The glass fiber having a flat cross section preferably has a ratio between the average fiber length and the average fiber diameter (aspect ratio) of 2 to 120, more preferably 2.5 to 70, still more preferably 3 to 50. A ratio between the fiber length and the average fiber diameter of lower than 2 may cause a poor effect of improving the mechanical strength. A ratio between the fiber length and the average fiber diameter of higher than 120 may cause a high anisotropy and poor appearance of the molded article. The average fiber diameter of the glass fiber having a flat cross section refers to the number average fiber diameter obtained when the flat cross-sectional shape is converted into a true circular shape having the same area as the flat cross-sectional shape. The average fiber length refers to the number average fiber length of the fiber in the powder composition of the disclosure. The number average fiber length is a value calculated using an image analyzer from optical microscopic images of filler residues collected after the molded article is subjected to treatment such as asking at high temperature, dissolution in a solvent, or decomposition with a chemical. The value is calculated without counting the fibers having a length not longer than the fiber diameter.

The fibrous filler (III) is preferably present in a mass proportion of 0 to 50% by mass, more preferably 5 to 40% by mass, still more preferably 10 to 30% by mass relative to the powder composition of the disclosure.

(Other Additives)

In order to improve the design, for example, of the powder composition of the disclosure, any of additives are advantageously used. These additives are described in detail below.

(IV) Dye and Pigment

The powder composition of the disclosure may further contain any of a variety of dyes and pigments to provide a molded article exhibiting any of a variety of design. Examples of dyes and pigments to be used in the powder composition of the disclosure include perylene-based dyes, coumarin-based dyes, thioindigo-based dyes, anthraquinone-based dyes, thioxanthone-based dyes, ferrocyanides such as Prussian blue, perinone-based dyes, quinoline-based dyes, quinacridone-based dyes, dioxazine-based dyes, isoindolinone-based dyes, and phthalocyanine-based dyes. The powder composition of the disclosure may further contain a metallic pigment to achieve better metallic color. A preferred metallic pigment is aluminum powder. Mixing a fluorescent brightener or a different light-emitting fluorescent dye can provide a better design effect utilizing the luminescent color.

(V) Heat-Absorptive Compound

The powder composition of the disclosure may contain a heat-absorptive compound. Preferred examples of this compound include various metal compounds having an excellent near-infrared light absorbing ability such as a phthalocyanine-based near-infrared absorber, a metal oxide-based near-infrared absorber, e.g., ATO, ITO, iridium oxide, ruthenium oxide, imonium oxide, and titanium oxide, and a metal boride-based or tungsten oxide-based near-infrared absorber such as lanthanum boride, cerium boride, and tungsten boride; and carbon filler. An example of the phthalocyanine-based near-infrared absorber is MIR-362, which is commercially available from Mitsui Chemicals, Inc. and is easily available. Examples of the carbon filler include carbon black, graphite (including both natural and artificial), and fullerene. Preferred are carbon black and graphite. One of these may be used alone or two or more thereof may be used in combination. The phthalocyanine-based near-infrared absorber is preferably contained in an amount of 0.0005 to 0.2 parts by mass, more preferably 0.0008 to 0.1 parts by mass, still more preferably 0.001 to 0.07 parts by mass relative to 100 parts by mass of the powder composition of the disclosure. The metal oxide-based near-infrared absorber, metal boride-based near-infrared absorber, and carbon filler are each preferably contained in an amount within a range from 0.1 to 200 ppm (proportion by mass), more preferably 0.5 to 100 ppm, in the powder composition of the disclosure.

(VI) Highly Light-Reflective White Pigment

The powder composition of the disclosure may contain a highly light-reflective white pigment to achieve a light-reflecting effect. The white pigment is particularly preferably a titanium dioxide pigment, especially titanium dioxide treated with an organic surface-treating agent such as silicone. The highly light-reflective white pigment is preferably contained in an amount of 3 to 30 parts by mass, more preferably 8 to 25 parts by mass, relative to 100 parts by mass of the resin composition. Two or more highly light-reflective white pigments may be used in combination.

(VII) Ultraviolet Absorber

The powder composition of the disclosure may contain an ultraviolet absorber to achieve weather resistance. Specific examples of the ultraviolet absorber include benzophenone-based ultraviolet absorbers such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone. Specific examples of the ultraviolet absorber include benzotriazole-based ultraviolet absorbers such as 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl) benzotriazole, 2,2'-methylenebis(4-cumyl-6-benzotriazolephenyl), 2,2'-p-phenylenebis(1,3-benzoxazin one), and 2-[2-hydroxy-3-(3,4,5,6-tetrahydrophthalimidomethyl)-5-methylphenyl]benzotriazole, and polymers having a 2-hydroxyphenyl-2H-benzotriazole skeleton such as a copolymer of 2-(2'-hydroxy methacryloxyethylphenyl)-2H-benzotriazole and a vinyl monomer copolymerizable with the former monomer and a copolymer of 2-(2'-hydroxy-5-acryloxyethylphenyl)-2H-benzotriazole and a vinyl monomer copolymerizable with the former monomer. Specific examples of the ultraviolet absorber include hydroxyphenyltriazine-based ultraviolet absorbers such as 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol, and 2-(4,6-diphenyl-1,3,5-triazin-2-yl)-5-butyloxyphenol. Examples thereof also include compounds obtainable by replacing the phenyl group in any of the aforementioned compounds by a 2,4-dimethylphenyl group, such as 2-(4,6-bis(2,4-dimethylphenyl)-1,3,5-triazin-2-yl)-5-hexyloxyphenol. Specific examples of the ultraviolet absorber include cyclic imino ester-based ultraviolet absorbers such as 2,2'-p-phenylenebis(3,1-benzoxazin-4-one), 2,2'-m-phenylenebis(3,1-benzoxazin-4-one), and 2,2'-p,p'-diphenylenebis(3,1-benzoxazin-4-one). Specific examples of the ultraviolet absorber also include cyanoacrylate-based ultraviolet absorbers such as 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene. The ultraviolet absorber may be a polymer-form ultraviolet absorber that is in the form of a copolymer of an ultraviolet absorptive monomer and/or a light-stable monomer with a monomer such as an alkyl (meth)acrylate as a result of having a structure of a radically polymerizable monomer compound. Preferred examples of the ultraviolet absorptive monomer include compounds containing a benzotriazole skeleton, a benzophenone skeleton, a triazine skeleton, a cyclic imino ester skeleton, or a cyanoacrylate skeleton in an ester substituent of a (meth)acrylic acid ester. In view of the ultraviolet absorbing ability, preferred among these are benzotriazole-based ultraviolet absorbers and hydroxyphenyltriazine-based ultraviolet absorbers. In view of the heat resistance and hue, preferred are cyclic imino ester-based ultraviolet absorbers and cyanoacrylate-based ultraviolet absorbers. Specific examples thereof include "Kemisorb 79" available from Chemipro Kasei Kaisha, Ltd. and "Tinuvin 234" available from BASF Japan Ltd. One of these ultraviolet absorbers may be used alone or two or more thereof may be used in the form of a mixture.

The ultraviolet absorber is preferably contained in an amount of 0.01 to 3 parts by mass, more preferably 0.01 to 1 part by mass, still more preferably 0.05 to 1 part by mass, particularly preferably 0.05 to 0.5 parts by mass, relative to 100 parts by mass of the powder composition of the disclosure.

(VIII) Antistatic Agent

The powder composition of the disclosure may be required to have antistatic performance in some cases. In such cases, the powder composition of the disclosure preferably contains an antistatic agent. Examples of the antistatic agent include (1) phosphonium organosulfonates such as phosphonium arylsulfonates, typified by phosphonium dodecylbenzenesulfonate, and phosphonium alkylsulfonates; and phosphonium borates such as phosphonium tetrafluoroborate. The phosphonium salt is appropriately contained in an amount of 5 parts by mass or less, preferably ranging from 0.05 to 5 parts by mass, more preferably from 1 to 3.5 parts by mass, still more preferably from 1.5 to 3 parts by mass, relative to 100 parts by mass of the powder composition of the disclosure. Examples of the antistatic agent include (2) organosulfonic acid alkali (alkaline earth) metal salts such as lithium organosulfonates, sodium organosulfonates, potassium organosulfonates, cesium organosulfonates, rubidium organosulfonates, calcium organosulfonates, magnesium organosulfonates, and barium organosulfonates. These metal salts can also be used as flame retarders, as described above. Specific examples of the metal salts include metal salts of dodecylbenzenesulfonic acid and metal salts of perfluoroalkanesulfonic acids. The organosulfonic acid alkali (alkaline earth) metal salt is appropriately contained in an amount of 0.5 parts by mass or less, preferably 0.001 to 0.3 parts by mass, more preferably 0.005 to 0.2 parts by mass, relative to 100 parts by mass of the powder composition of the disclosure. Particularly preferred are salts of alkali metals such as potassium, cesium, and rubidium.

Examples of the antistatic agent include (3) ammonium organosulfonates such as ammonium alkylsulfonates and ammonium arylsulfonates. The ammonium salt is appropriately contained in an amount of 0.05 parts by mass or less relative to 100 parts by mass of the powder composition of the disclosure. Examples of the antistatic agent include (4) polymers containing a poly(oxyalkylene) glycol component as a constituent, such as polyether ester amide. The polymer is appropriately contained in an amount of 5 parts by mass or less relative to 100 parts by mass of the powder composition of the disclosure.

(IX) Filler

The powder composition of the disclosure may contain any of a variety of known fillers as reinforcing filler other than fibrous fillers. Examples of such fillers include a variety of platy filler and powdery filler. The platy filler means filler in the form of plates, including those having a rough surface and those having a curved portion. The powdery filler means filler having a shape other than these shapes, including filler having an indefinite shape.

Preferred examples of the platy filler include glass flakes, talc, mica, kaolin, metal flakes, carbon flakes, and graphite, and platy filler prepared by coating the surface of any of these fillers with a different material such as a metal or a metal oxide. The particle size thereof preferably ranges from 0.1 to 300 μm. For filler having a particle size within a range up to about 10 μm, the particle size corresponds to the median size (D50) in the particle size distribution determined by X-ray transmission, which is one of liquid sedimentation techniques. For filler having a particle size within a range of 10 to 50 μm, the particle size corresponds to the median size (D50) in the particle size distribution determined by laser diffraction/scattering. For filler having a particle size within a range of 50 to 300 μm, the particle size corresponds to the particle size determined by vibration sieving. The particle size is a value in the resin composition. The platy filler may be surface-treated with any of a variety of coupling agents such as silane coupling agents, titanate coupling agents, aluminate coupling agents, and zirconate coupling agents. Alternatively, the platy filler may be a granulated product prepared by bundling the platy filler with any of a variety of resins such as olefinic resin, styrenic resin, acrylic resin, polyester resin, epoxy resin, and urethane resin or a higher fatty acid ester or by compressing the platy filler.

(X) Crystal Nucleating Agent

The powder composition of the present disclosure may be required to have high crystallinity in some cases. In such cases, the powder composition of the disclosure may contain a crystal nucleating agent. The crystal nucleating agent may include at least one compound selected from the group consisting of phosphate esters and their salts, and phosphate ester complex compounds. Typical examples of the phosphate ester compounds include phosphates, phosphites, acid phosphates, acid phosphites, and their salts with ammonia, amine, melamine, alkali metals, or alkaline earth metals. The specific structure thereof is not limited.

Specific examples include: acid phosphates and acid phosphites such as triphenyl phosphate, trilauryl phosphate, tristearyl phosphate, trioleyl phosphate, xylene diphenyl phosphate, ethyl diphenyl phosphate, isopropyl diphenyl phosphate, n-butyl diphenyl phosphate, 2-ethylhexyl diphenyl phosphate, isodecyl diphenyl phosphate, cetyl diphenyl phosphate, stearyl diphenyl phosphate, oleyl diphenyl phosphate, butyl dicresyl phosphate, octyl dicresyl phosphate, lauryl dicresyl phosphate, dibutyl pyrophosphate, monophenyl acid phosphate, diphenyl acid phosphate, monocresyl acid phosphate, dicresyl acid phosphate, monoxylenyl acid phosphate, 2-acryloyloxyethyl acid phosphate, 2-methacryloyloxyethyl acid phosphate, diphenyl (2-acryloyloxyethyl) phosphate, diphenyl (2-methacryloyloxyethyl) phosphate, trinaphthyl phosphate, trinonylphenyl phosphate, tris(2,6-dimethylphenyl) phosphate, tetraphenylresorcinol diphosphate, tetraphenylhydroquinone diphosphate, tetraphenylbisphenol A diphosphate, tetra(2,6-dimethylphenyl) resorcinol diphosphate, tetra(2,6-dimethylphenyl)bisphenol A diphosphate, tetra(2,6-dimethylphenyl)biphenyl diphosphate, tetraphenylethylene glycol diphosphate, bis(2,6-dimethylphenyl)pentaerythritol diphosphate, and dixylenyl acid phosphate; salts of acid phosphate and acid phosphites with ammonia, amine, melamine, alkali metals, or alkaline earth metals such as dimethyl phosphate ammonium salt, diethyl phosphate ammonium salt, ethyl phosphate ammonium salt, di-n-butyl phosphate ammonium salt, dibutoxyethyl phosphate triethanolamine salt, dioctylphosphate morpholine salt, mono-n-butylphosphate soda salt, diphenylphosphate ammonium salt, diphenylphosphate melamine salt, diphenylphosphate piperazine salt, phenylphosphate ammonium salt, dicresyl phosphate ethylenediamine salt, cresyl phosphate soda salt, and dixylenyl phosphate melamine salt. More specific examples include salts of phosphate esters such as sodium bis(4-t-butylphenyl) phosphate and sodium 2,2'-methylenebis(4,6-di-t-butylphenyl) phosphate, and (2-hydroxy-2-oxo-4,6,10,12-tetra-t-butyl-1,3,2-dibenzo[d,g]perhydrodioxaphosphocin sodium salt. The ester may be a monoester, a diester, a triester, or a higher ester. One of these may be used alone or two or more thereof may be used in combination.

(X) Different Resin and/or Elastomer

The powder composition of the disclosure may contain a small proportion of a different resin and/or elastomer instead of a portion of the resin component to the extent that the effects of the disclosure are not impaired and can be achieved. The different resin and/or elastomer is preferably contained in an amount of 20 parts by mass or less, more preferably 10 parts by mass or less, still more preferably 5 parts by mass or less, most preferably 3 parts by mass or less, relative to 100 parts by mass of the powder composition of the disclosure. Examples of the different resin include resins such as polyester resins, including polyethylene terephthalate, polybutylene terephthalate, polyethylene naphthalate, and liquid crystal polymers, polyamide resin, aromatic polyamide resin, semi-aromatic polyamide resin, polyimide resin, polyamideimide resin, polyetherimide resin, polyurethane resin, silicone resin, polyphenylene ether resin, polyphenylene sulfide resin, polysulfone resin, polyether sulfone resin, polyketone sulfide resin, polybenzoimidazole resin, polymethacrylate resin, phenol resin, and epoxy resin. Examples of the different elastomer include isobutylene-isoprene rubber, styrene-butadiene rubber, ethylene-propylene rubber, acrylic elastomers, polyester elastomers, polyamide elastomers, and core-shell elastomers such as methyl methacrylate-styrene-butadiene (MBS) rubber, methyl methacrylate-butadiene (MB) rubber, and methyl methacrylate-acrylonitrile-styrene (MAS) rubber, fluororubber, and a fluorine-containing elastomer.

(XII) Other Additives

The powder composition of the disclosure may contain any of additives such as a fluidity improver, an antibacterial agent, a dispersant such as a liquid paraffin, a light-catalytic soil resistant agent, and a photochromic agent.

In the powder composition of the disclosure, the sum of the aromatic polyetherketone resin (I) and the fluorine-containing copolymer (II) is preferably 100 to 50% by mass. Less than 50% by mass in total of these components may cause the absence of tensile elongation at break, impact resistance, and flexibility and may cause a failure in providing desired mechanical properties.

The powder composition of the disclosure is not a dry blend of the powder particles of the aromatic polyetherketone resin (I) and the powder particles of the fluorine-containing copolymer (II) or a composition prepared by mixing a dispersion containing the particles of the aromatic polyetherketone resin (I) and a dispersion containing the particles of the fluorine-containing copolymer (II). The powder composition of the disclosure is composed of powder particles in each of which these resins are integrated like an alloy. The powder composition of the disclosure can be produced, for example, by melt-kneading the aromatic polyetherketone resin (I) and the fluorine-containing copolymer (II). The disclosure also provides a method for producing a resin composition, including a step of melt-kneading the aromatic polyetherketone resin (I) and the fluorine-containing copolymer (II). Melt-kneading in preparation of the resin composition of the disclosure improves adhesion between the aromatic polyetherketone resin (I) and the fluorine-containing copolymer (II), allowing the resin composition of the disclosure to exhibit desired physical properties.

Melt-kneading is preferably carried out with a high shear force applied to the aromatic polyetherketone resin (I) and the fluorine-containing copolymer (II). Specifically, the melt-kneading is preferably performed at a shear rate of 600 $sec^{-1}$ (/sec) or higher.

The shear rate is more preferably 700 $sec^{-1}$ (/sec) or higher, still more preferably 750 $sec^{-1}$ (/sec) or higher, particularly preferably 800 $sec^{-1}$ (/sec) or higher. This allows the fluorine-containing copolymer (II) to be dispersed in the submicron order in the aromatic polyetherketone resin (I) and can reduce the agglomerating behavior of the fluorine-containing copolymer (II) during molding. As a result, the powder composition obtained has much better fluidity, and can provide a molded article having much better tensile properties, much better flexibility, much better impact resistance, much better slidability, and much lower dielectricity.

The shear rate (γ) is a value determined using the following formula, for example.

| | |
|---|---|
| $\gamma =$ | $\pi Dr/C$ |
| D: | screw outer diameter (mm) |
| r: | screw rotation speed (rps) |
| C: | tip clearance (mm) |

The melt-kneading may be performed using any device and, under kneading conditions arranged for more effective application of shear force, such as the use of a special screw, a high rotation speed, and a narrow clearance, can be performed using any conventionally known device such as a twin-screw extruder, a single-screw extruder, a multi-screw extruder, a roll kneader such as a tandem extruder or a batch kneader, a Labo Plastomill, a Banbury mixer, a pressurizing kneader, or a blending mill. This allows the fluorine-containing copolymer to be dispersed in the submicron order in the aromatic polyetherketone resin and can reduce the agglomerating behavior of the fluorine-containing copolymer during molding. This results in a molded article of the resin composition that does not suffer peeling of the surface and that has much better tensile properties, much better flexibility, much better impact resistance, and much lower dielectricity. In order to apply a high shear force, the melt-kneading is preferably performed using a twin-screw extruder or a high shear processor (reflux high shear processor) including a kneading section provided with an internal return screw.

The internal return screw is a screw provided with a return hole along the central axis of the screw from the tip toward the back end. In a high shear processor including a kneading section provided with an internal return screw, a molten resin is charged into the kneading section and sent toward the tip along with the rotation of the internal return screw, flows into the return hole through an inlet on the tip to the back side and is ejected through an outlet, and is again sent toward the tip along with the rotation of the internal return screw, thereby completing circulation. This circulation can highly disperse and mix the molten resin and reduce the size of the dispersed phase. Examples of the high shear processor include devices disclosed in JP 2005-313608 A and JP 2011-046103 A.

In the case where a twin-screw extruder is used as a kneader, a twin-screw extruder having a large L/D screw structure is preferably used. The screw structure of the twin-screw extruder preferably has L/D=30 or higher, more preferably L/D=35 or higher, still more preferably L/D=40 or higher. The L/D means (effective screw length (L))/(screw diameter (D)). In order to improve the kneading performance and the productivity, the melt-kneading is most preferably performed using a twin-screw extruder.

The duration of the melt-kneading is preferably 1 to 600 sec, more preferably 5 to 300 sec. A melt-kneading duration longer than the above duration may cause significant degradation of the resin and may cause a failure in achieving the desired performance. A melt-kneading duration shorter than the above duration may cause poor dispersibility and may cause a failure in achieving the desired performance.

The temperature of the melt-kneading is not lower than the melting point of the aromatic polyetherketone resin as well as not lower than the melting point of the fluorine-containing copolymer (II), and is preferably 240° C. to 450° C., more preferably 260° C. to 400° C.

The powder composition of the disclosure is obtainable, for example, by pulverizing a kneaded product resulting from melt-kneading, using a mechanical pulverizer. Examples of the mechanical pulverizer include impact pulverizers and grinding pulverizers. Impact pulverizers include a cutter mill, a hammer mill, a pin mill, a jet mill, a bead mill, a sand mill, and a turbo mill. Grinding pulverizers include a pulverizer that performs pulverization by shearing force generated by unevenness of a rotary blade and a peripheral stator. The pulverization temperature may be −200° C. to 100° C. The pulverization temperature of lower than −200° C. undesirably increases the production cost. The pulverization temperature of higher than 100° C. exceeds the glass transition temperature of the fluororesin, by which pulverization becomes undesirably difficult. The temperature of freeze pulverization is −200° C. to −100° C. Liquid nitrogen can be used in freeze pulverization. The kneaded product obtained by the kneading is preferably pulverized by impact pulverization, preferably by dry pulverization such as pulverization using a turbo mill or a jet mill, or freeze pulverization, more preferably by freeze pulverization.

The particle size of the powder composition of the disclosure in terms of D50 is preferably 3 μm or larger and 300 μm or smaller, more preferably 5 μm or larger and 250 μm or smaller, still more preferably 10 μm or larger and 200 μm or smaller, particularly preferably 15 μm or larger and 150 μm or smaller. Setting the particle size (D50) to 3 μm or larger improves the fluidity of the powder composition, facilitating formation of a uniform thin layer. Increasing the particle size (D50) can further improve the fluidity of the powder composition. Setting the particle size (D50) to 300 μm or smaller allows the powder composition of the disclosure to easily produce a coating film or three-dimensionally printed article with a smooth surface. Setting the particle size (D50) smaller can facilitate production of a coating film or three-dimensionally printed article with a smoother surface.

The particle size of the powder composition of the disclosure, in terms of D10, is preferably 1 μm or larger and 100 μm or smaller, more preferably 3 μm or larger and 75 μm or smaller, still more preferably 10 μm or larger and 50 μm or smaller. Setting the particle size (D10) to 1 μm or larger can improve the fluidity of the powder composition, facilitating formation of a uniform thin layer. Increasing the particle size (D10) can further improve the fluidity of the powder composition. Setting the particle size (D10) to 100 μm or less allows the powder composition to easily produce a coating film or three-dimensionally printed article with a smooth surface. Setting the particle size (D10) smaller can facilitate production of a coating film or three-dimensionally printed article with a smoother surface.

The particle size in terms of D90 of the powder composition of the disclosure is preferably 20 μm or larger and 800 μm or smaller, more preferably 50 μm or larger and 500 μm or smaller, still more preferably 80 μm or larger and 400 μm or smaller. Setting the particle size (D90) to 20 μm or larger can improve the fluidity of the powder composition, facilitating formation of a uniform thin layer. Increasing the particle size (D90) can further improve the fluidity of the powder composition. Setting the particle size (D90) to 800 μm or smaller allows the powder composition to produce a coating film or three-dimensionally printed article with a smooth surface. Setting the particle size (D90) smaller can facilitate obtaining a coating film or three-dimensionally printed article with a smoother surface.

The particle size of the powder composition of the disclosure is preferably, in terms of D50, 3 μm or larger and 300 μm or smaller, more preferably 5 μm or larger and 250 μm or smaller, still more preferably 10 μm or larger and 200 μm or smaller, even more preferably 15 μm or larger and 150 μm or smaller; in terms of D10, preferably 1 μm or larger and 100 μm or smaller, more preferably 3 μm or larger and 75 μm or smaller, still more preferably 10 μm or larger and 50 μm or smaller; and in terms of D90, preferably 20 μm or larger and 800 μm or smaller, more preferably 50 μm or larger and 500 μm or smaller, still more preferably 80 μm or larger and 400 μm or smaller.

Here, the "D10", "D50", and "D90" are so-called cumulative volume particle sizes, and each refer to the particle size at which the cumulative volume value of the particles not larger than that particle size reaches 10%, 50%, or 90% in the cumulative curve of the volume-based particle size distribution in which the total volume is set as 100%. The particle size herein is measured by a laser diffraction method.

The angle of repose of the powder composition of the disclosure is preferably 20° or larger and 55° or smaller, more preferably 20° or larger and 50° or smaller, still more preferably 25° or larger and 45° or smaller. Production of a powder composition with the angle of repose of 20° or larger is not difficult. A powder composition with the angle of repose of 55° or smaller has better powder fluidity to reduce troubles such as bridging in a powder supply tank upon electrostatic coating or clogging of a coating gun.

The measurement of the angle of repose herein is performed on powder dropped from an angle of repose tester by the method described in JIS K 6891.

The melting point of the pulverized composition of the disclosure may preferably be 300° C. or higher and 380° C. or lower, more preferably 300° C. or higher and 360° C. or lower. The powder composition having a melting point within the above range has better processibility to provide a molded article such as a three-dimensionally printed article having better tensile strength.

The melting point is the temperature corresponding to the maximum value on a heat-of-fusion curve with a temperature-increasing rate of 10° C./min using a differential scanning calorimeter (DSC).

The pulverized composition of the disclosure has a melt viscosity at 60 $sec^{-1}$ and 390° C. of preferably 0.01 $kNsm^2$ or more and 4.0 $kNsm^{-2}$ or less, more preferably 0.05 $kNsm^2$ or more and 2.5 $kNsm^{-2}$ or less, still more preferably 0.10 $kNsm^{-2}$ or more and 1.0 $kNsm^{-2}$ or less. The composition having a melt viscosity within the above range can provide a molded article such as a three-dimensionally printed article achieving all of processibility, excellent impact resistance, and excellent tensile properties.

The melt viscosity is measured in conformity with ASTM D3835-02.

The powder compositions of the disclosure may be one prepared by adding known components that may be post-added after powdering. Such additive components may be added to the powder by a known method such as dry-blending of the powder composition of the disclosure and the powder of additive components. A three-dimensionally printed article formed from the powder composition of the disclosure has excellent tensile elongation at break. The article is also excellent in impact resistance, flexibility, and slidability.

The powder composition of the disclosure is particularly suitable for use as a powder coating material and a composition for three-dimensional printing, which will be described later. The powder composition can also be used as a material for injection molding, extrusion molding, compression molding, prepreg molding, and the like.

In injection molding, not only normal cold runner molding but also hot runner molding that enables runnerless molding can be employed for the production. In addition to conventional molding methods, also employable are gas-assisted injection molding, injection-compression molding, ultra-high-speed injection molding, injection press molding, two-color molding, sandwich molding, in-mold coating molding, insert molding, foam molding (including one using a supercritical fluid), rapid heat and cool molding, adiabatic molding, and in-mold remelt molding, and combinations of these. The powder composition of the disclosure can also be used for film molding, extrusion molding, wire molding by extrusion, tube molding, and sheet molding.

According to a preferred embodiment, the powder composition of the disclosure is a powder coating material. The powder composition disclosed in the present application can be used as a powder coating material to form a coating film having excellent impact resistance. In addition, the resulting coating film has excellent impact resistance, excellent smoothness, excellent slidability, and excellently low dielectricity.

The powder composition of the disclosure is normally applied to an object to be coated and then heated and fired to form a film. The coating film obtained in this manner can be used in various applications as a paint material for metal coating or as a composite substrate (paint-coated substrate, coating-treated substrate, etc.) composed of a coating film formed using the paint material.

The coating film of the disclosure is obtained by applying the powder composition. The coating film of the disclosure is normally formed by applying the powder composition to an object to be coated and heating and firing the composition to form a film. The temperature for heating and firing the powder composition applied to the object to be coated may be appropriately set according to the aromatic polyetherketone resin (I) and the fluorine-containing copolymer (II) used. The temperature may be, for example, 300° C. to 500° C., preferably 300° C. to 400° C. The duration of the heating and firing is not limited, and may be, for example, 30 seconds to 60 minutes, or 1 to 30 minutes. In the cases where the powder coating material is applied and fired for multiple times, the duration of the heating and firing indicates one firing duration.

The coating film of the disclosure may be obtained by electrodeposition coating of the powder composition. Electrodeposition coating is normally performed, for example, at a bath temperature of 10° C. to 40° C. (preferably 15° C. to 35° C.), a voltage of 50 to 500 V (preferably 100 to 300 V), and an inter-electrode distance of 1 to 100 cm (preferably 10 to 50 cm) for an energization duration of 0.5 to 10 minutes (preferably 1 to 5 minutes).

The film thickness of the coating film of the disclosure may be appropriately determined depending on the application, and may be, for example, 20 to 10000 μm. The film thickness may be 20 to 200 μm (thin coating) or greater than 200 μm and 10000 μm or smaller (thick coating). The film thickness refers to the film thickness after heating and firing, and may be the film thickness of the coating film obtained by one application, or may be the film thickness obtained by two or more applications.

The powder composition may be applied by any method such as electrostatic coating, electrostatic spray coating, electrostatic dipping, nebulization, fluid dipping coating, spraying, thermal spraying, blast coating, and plasma thermal spraying. The powder composition of the disclosure is preferably applied onto a substrate by one method or a combination of two or more methods selected from the above methods. In order to achieve better surface smoothness of the resulting coating film, preferred is an electrostatic coating method using a powder coating gun. Examples of the powder coating gun include corona charging coating guns and friction charging coating guns.

Examples of the material of the substrate to be coated with the powder composition of the disclosure includes metals (e.g., aluminum, copper, iron, silver, nickel, titanium, alloys such as stainless steel), ceramic materials (e.g., glass), plastic materials, and wood. Preferred among these are metal substrates (substrates made of metal). The powder composition of the disclosure may be suitably used as a coating material for metal coating.

The disclosure also encompasses an article including the coating film on an object to be coated. The article of the disclosure includes the coating film and an object to be coated, and normally has the coating film on the surface of the object to be coated. The object to be coated is suitably used for, but is not limited to, objects desired to have heat resistance, impact resistance, slidability, and chemical resistance. Examples of such an object to be coated include: those to which corrosion-resistant lining is applied, such as tanks, vessels, towers, valves, pumps, joints, and other piping materials; those to which anti-corrosion treatment other than the corrosion-resistant lining is performed, such as chemical/medical instruments, wafer baskets, coil bobbin tower packings, chemical valves, and pump impellers; industrial mixers and stirrers, high performance washers, compressor components, industrial rollers and bearings, spinning machines, cooking utensils, food processing belts, semiconductor manufacturing equipment, ultrapure water manufacturing equipment, semiconductor substrates, sliding parts of mobile phones, electric appliances, and sports equipment. The object to be coated may be one subjected to surface treatment such as cleaning or sandblasting, or primer coating, if necessary.

In a preferred embodiment, the powder composition of the disclosure is a composition for three-dimensional printing. Use of the powder composition disclosed in the application as a composition for three-dimensional printing enables formation of a three-dimensionally printed article that is resistant to cracking. The resulting three-dimensionally printed article is excellent in impact resistance, toughness, low dielectricity, and tensile properties. The disclosure also encompasses a three-dimensionally printed article obtainable by molding the powder composition.

The three-dimensionally printed article of the disclosure is obtainable by molding the powder composition. In the three-dimensionally printed article of the disclosure, preferably, the fluorine-containing copolymer (II) is dispersed in the form of particles in the aromatic polyetherketone resin (I). In such a case, normally, the aromatic polyetherketone resin (I) forms a continuous phase and the fluorine-containing copolymer (II) forms a dispersed phase.

The three-dimensionally printed article of the disclosure contains an aromatic polyetherketone resin (I) and a fluorine-containing copolymer (II). The article satisfies a ratio r2/r1 of 1.60 or lower, wherein r1 represents the average dispersed particle size of the fluorine-containing copolymer (II) and r2 represents the average dispersed particle size of the fluorine-containing copolymer (II) after melt flow rate measurement at 380° C. and a 500-g load with 5-minute pre-heating in conformity with ASTM D1238. The three-dimensionally printed article of the disclosure having the above structure has excellent mechanical strength and is particularly excellent in impact resistance. In the three-dimensionally printed article of the disclosure, the ratio r2/r1 is 1.60 or less. In order to achieve better toughness, better flexibility, better tensile elongation at break, better impact resistance, and lower dielectricity, the ratio r2/r1 is more preferably 1.50 or less, still more preferably 1.47 or less.

The three-dimensionally printed article of the disclosure preferably has a tensile elongation at break of 10% or higher, more preferably 15% or higher. The three-dimensionally printed article produced using the powder composition of the disclosure can have a tensile elongation at break of 20% or higher, or 40% or higher. The upper limit of the tensile elongation at break is not limited and the higher the better. The upper limit may be, for example, 200%.

The tensile elongation at break is a value measured by an Autograph at a test speed of 2 mm/min in conformity with ASTM D 638.

The three-dimensionally printed article of the disclosure preferably has a notched Charpy impact strength of 15 $KJ/m^2$ or more, more preferably 20 $KJ/m^2$ or more. The upper limit of the notched Charpy impact strength is not limited and the greater the better. The upper limit may be, for example, 200 $KJ/m^2$.

The notched Charpy impact strength is a value measured in conformity with ASTM D6110-02.

In the three-dimensionally printed article of the disclosure, the fluorine-containing copolymer (II) preferably has average dispersed particle sizes of 4 μm or smaller. In order to provide a three-dimensionally printed article having better properties and to achieve better printability, the average dispersed particle sizes of the fluorine-containing copolymer (II) are more preferably 3 μm or smaller, still more preferably 2 μm or smaller. The lower limit of the average dispersed particle sizes may be, but is not limited to, 0.01 μm.

In the three-dimensionally printed article of the disclosure, the fluorine-containing copolymer (II) preferably has a maximum dispersed particle size of 10 μm or smaller. In order to achieve much better mechanical properties, the maximum dispersed particle size of the fluorine-containing copolymer (II) is more preferably 5 μm or smaller. The lower limit of the maximum dispersed particle size may be, but is not limited to, 0.01 μm or smaller.

The average dispersed particle sizes and the maximum dispersed particle size of the fluorine-containing copolymer (II) in the three-dimensionally printed article of the disclosure are determined by the same procedure as that for the powder composition of the disclosure.

The aromatic polyetherketone resin (I) and the fluorine-containing copolymer (II) in the three-dimensionally printed article of the disclosure are the same as those described for the powder composition of the disclosure. Further, for the melt viscosity ratio (I)/(II) between the aromatic polyetherketone resin (I) and the fluorine-containing copolymer (II), the ratio by mass (I):(II) of the aromatic polyetherketone resin (I) to the fluorine-containing copolymer (II), MFR, and the like in the three-dimensionally printed article of the disclosure, all the preferred embodiments described above for the powder composition can be employed.

The three-dimensionally printed article of the disclosure may contain components other than the aromatic polyetherketone resin (I) and the fluorine-containing copolymer (II), if necessary. For example, the three-dimensionally printed article of the disclosure may contain those described as the components other than the aromatic polyetherketone resin (I) and the fluorine-containing copolymer (II) in the powder composition. In particular, the three-dimensionally printed article of the disclosure may contain any of the fibrous filler (III), the dyes and pigments (IV), the heat-absorptive compounds (V), the highly reflective white pigments (VI), the ultraviolet absorbers (VII), the antistatic agents (VIII), the fillers (IX), the other resins and elastomers (X), other additives (XI), etc.

In the three-dimensionally printed article of the disclosure, the sum of the aromatic polyetherketone resin (I) and the fluorine-containing copolymer (II) is preferably 100% by mass to 50% by mass.

Examples of the method for producing the three-dimensionally printed article of the disclosure include powder bed fusion, fused deposition modeling, and ink-jetting. Particularly preferred is powder bed fusion. Powder bed fusion is suitable for precision printing compared to other printing methods. Since the heating time for the resin is relatively short, powder bed fusion is particularly suitable for the powder composition of the disclosure containing the aromatic polyetherketone resin (I) and the fluorine-containing copolymer (II) in combination. Next, a method for printing the printing material of the disclosure by powder bed fusion will be described.

A three-dimensional printer employing powder bed fusion generally includes powder storage containers that store printing materials on both sides of a print bed that performs printing. The printer is further equipped with a recoater that supplies the printing materials in the powder storage containers to the print bed to form a thin layer, and a laser section that irradiates the thin layer with a laser.

First, a necessary amount of printing material is stored in the powder storage containers. Then, the height of the print bed is lowered by a height corresponding to the thickness of the thin layer. The bottom of one powder storage container is raised so that the printing material in an appropriate amount is present over the powder storage container. This printing material is supplied to the print bed by the recoater, and a thin layer is formed on the print bed by moving the recoater so as to level the surface. Next, based on the slice data of the three-dimensional structure to be printed, the thin layer is scanned with laser light to fuse and bond the thin layer of powder particles to cure the powder. By repeating this operation, layers corresponding to slice data are sequentially formed to form a three-dimensional structure.

The disclosure relates to a powder composition containing an aromatic polyetherketone resin (I) and a fluorine-containing copolymer (II) (hereinafter also referred to as the "powder composition of the disclosure").

The aromatic polyetherketone resin (I) and the fluorine-containing copolymer (II) have a ratio by mass (I):(II) of preferably 99:1 to 30:70.

The aromatic polyetherketone resin (I) preferably has a melting point of 300° C. to 380° C.

The aromatic polyetherketone resin (I) preferably has a glass transition temperature of 130° C. to 220° C.

The fluorine-containing copolymer (II) preferably has a melting point of 200° C. to 323° C.

The powder composition satisfies a ratio r2/r1 of 1.60 or lower, wherein r1 represents an average dispersed particle size of the fluorine-containing copolymer (II) and r2 represents an average dispersed particle size of the fluorine-containing copolymer (II) after melt flow rate measurement at 380° C. and a 5000-g load with 5-minute pre-heating in conformity with ASTM D1238.

The powder composition preferably further contains an additive.

The additive preferably contains a fibrous filler (III).

The powder composition is preferably a powder coating material.

The disclosure also relates to a coating film obtainable by applying the powder composition (hereinafter also referred to as the "coating film of the disclosure").

The disclosure also relates to a three-dimensionally printed article obtainable by molding the powder composition (hereinafter also referred to as the "three-dimensionally printed article of the disclosure").

EXAMPLES

The disclosure is described with reference to, but not limited to, examples.

<Melt Flow Rate (MFR)>

(1) The MFR of the fluorine-containing copolymer is measured using a melt indexer at 380° C. and a 5000-g load in conformity with ASTM D1238.

(2) The MFR of the aromatic polyetherketone resin is measured using a melt indexer at 380° C. and a 5000-g load in conformity with ASTM D1238.

(3) The MFR of the powder composition obtained by mixing the fluorine-containing copolymer and the aromatic polyetherketone resin is a value measured at 380° C. and a 5000-g load with 5-minute preheating in conformity with ASTM D1238.

<Melting Point>

The melting point of the fluorine-containing copolymer is the temperature corresponding to the maximum value on a heat-of-fusion curve with a temperature-increasing rate of 10° C./min using a differential scanning calorimeter (DSC).

The melting point of the aromatic polyetherketone resin was determined as the temperature corresponding to the maximum value on a heat-of-fusion curve with a temperature-increasing rate of 10° C./min using a differential scanning calorimeter (DSC).

<Glass Transition Temperature (Tg)>

The glass transition temperature (Tg) was measured using a differential scanning calorimeter (DSC).

<Calculation of Average Dispersed Particle Size>

The kneaded products (powder compositions) obtained in the examples, the strands obtained in MFR measurement in the examples, and the sections cut out from the three-dimensionally printed articles obtained in the examples were each cut in the direction perpendicular to the flow direction, and the cross section was photographed with a confocal laser microscope. The resulting micrograph was analyzed with image analysis software (Image J). The dispersed phases were selected, and the equivalent circle diameters were measured. The equivalent circle diameters of 20 dispersed phases were calculated and averaged. Thus, the average dispersed particle size r1 and the average dispersed particle size r2 were determined.

<Shear Rate During Kneading>

The shear rate (γ) during kneading was obtained using the following formula.

| | |
|---|---|
| $\gamma$ = | $\pi Dr/C$ |
| D: | screw outer diameter (mm) |
| r: | screw rotation speed (rps) |
| C: | tip clearance (mm) |

<Surface Smoothness of Coating Film>

The coating films obtained in the examples and comparative examples were visually observed, and the surface smoothness was evaluated according to the following criteria.

A: No irregularities are present at all, and the entire surface is uniform.

B: Almost no irregularities are present, and the entire surface is uniform.

C: Many irregularities are present, and the entire surface is not uniform.

<Evaluation of Impact Strength of Coating Film>

The test plates with a coating film obtained in the examples and comparative examples were used for evaluation in conformity with the DuPont impact test (JIS K 5600-5-3). A 1000-g weight was dropped on the coating film surface using a DuPont impact tester. The presence or absence of breakage or cracks on the coating film surface was observed and evaluated according to the following criteria.

A: No breakage or cracks are observed even after dropping of the weight from a height of 50 cm or higher.

B: No breakage or cracks are observed after dropping of the weight from a height of 25 cm or higher but lower than 50 cm.

C: Breakage or cracks are observed after dropping of the weight from a height of lower than 25 cm.

<Measurement of Slidability (Abrasion Loss)>

Each of the test plates with a coating film obtained in the examples and comparative examples was brought into contact with an opposite material cylinder under the following conditions in conformity with the thrust friction abrasion test method (JIS K-7218), and the abrasion loss of the test plate with a coating film was evaluated.

Load: 500 N/cm$^2$, circumferential speed: 0.5 m/s, test time: 30 min.

Opposite material cylinder (material: S45C, outer diameter: 20.5 mm, inner diameter: 16.5 mm)

Measurement atmosphere: no lubrication, room temperature (25° C.)

<Measurement of Tensile Elongation at Break>

The tensile elongation at break of each of the three-dimensionally printed articles obtained in the examples and comparative examples was measured using an Autograph in conformity with ASTM D638. The measurement was performed under the condition of a test speed of 2 mm/min.

<Measurement of Charpy Impact Strength>

The three-dimensionally printed articles obtained in the examples and comparative examples were notched, and measurement was performed thereon using an impact tester in conformity with ASTM D6110-02.

<Particle Sizes (D10, D50, D90)>

The particle sizes were measured by a laser diffraction method using MT3300EX II (available from Nikkiso Co., Ltd.).

<Angle of Repose>

The angle of repose was measured using a powder tester PT-X (available from Hosokawa Micron Corporation). The smaller the angle of repose, the better the powder fluidity.

In the examples and comparative examples, the following materials were used.

Aromatic polyetherketone resin (1): polyetherketoneketone (MFR: 40 g/10 min, melting point: 331° C., Tg: 162° C.)

Aromatic polyetherketone resin (2): polyetherketoneketone (MFR: 92 g/10 min, melting point: 336° C., Tg: 162° C.)

Aromatic polyetherketone resin (3): polyetherketoneketone (MFR: 41 g/10 min, melting point: 301° C., Tg: 160° C.)

Aromatic polyetherketone resin (4): polyetherketoneketone (MFR: 88 g/10 min, melting point: 301° C., Tg: 160° C.)

Aromatic polyetherketone resin (5):

polyetherketoneketone (MFR: 79 g/10 min, melting point: 360° C., Tg: 165° C.)

Aromatic polyetherketone resin (6): polyetheretherketone (MFR: 25 g/10 min, melting point: 340° C., Tg: 143° C.)

Aromatic polyetherketone resin (7): polyetheretherketone (MFR: 10 g/10 min, melting point: 342° C., Tg: 143° C.)

Polyphenylene sulfide resin (8): Ryton V1 available from Tosoh Susteel (MFR: 300 g/10 min, melting point: 275° C., Tg: 92° C.)

Fluorine-containing copolymer (1): TFE/HFP/PPVE copolymer (MFR: 29.8 g/10 min, melting point: 260° C.)

Fluorine-containing copolymer (2): TFE/HFP copolymer (MFR: 6 g/10 min, melting point: 270° C.)

Fluorine-containing copolymer (3): TFE/PPVE copolymer (MFR: 31.4 g/10 min, melting point: 301° C.)

Fluorine-containing copolymer (4): TFE/PPVE copolymer (modified PTFE, melting point: 325° C.)

Fluorine-containing copolymer (5): PTFE (melting point: 327° C.)

Example 1

The aromatic polyetherketone resin (1) and the fluorine-containing copolymer (1) were dry-blended in the ratio (% by mass) shown in Table 1 and dried at 120° C. for eight hours. The dried mixture was melt-kneaded using a reflux high shear processor available from Niigata Machine Techno Co., Ltd. under the following predetermined conditions. The return hole used had a diameter of 2.5 mm.

Screw L/D: 1.8

Kneading temperature: 370° C.

Shear rate during kneading: 870 $sec^{-1}$

Kneading duration: 10 seconds

<Production of Powder Composition>

The resulting kneaded product was embrittled with liquid nitrogen and pulverized with a freeze pulverizer using a hammer mill, whereby a powder composition was obtained.

<Production of Coating Film>

The obtained powder composition was applied to an aluminum plate (100 mm×100 mm×1.5 mm) by electrostatic coating using EP-MC10 available from ANEST IWATA Corporation as an electrostatic coating machine in a manner that the film thickness after firing was about 200 μm. After coating, the aluminum plate coated with the composition was heated in an atmosphere at 380° C. for 60 minutes. Thus, a baked coating film was obtained. The baked coating film was cooled to room temperature, and the obtained aluminum plate with the coating film was used as a test plate to evaluate smoothness, impact strength, and slidability (abrasion loss). Table 1 shows the results.

<Production of Three-Dimensionally Printed Article>

The obtained powder composition was formed into three-dimensionally printed articles including an ASTM multi-purpose test specimen and an ASTM-V dumbbell by powder bed fusion. A tensile test and a notched Charpy impact test evaluation were performed on each of the obtained three-dimensionally printed articles. Table 1 shows the results.

Examples 2 to 7

Powder compositions were obtained as in Example 1, except that the type of the aromatic polyetherketone resin, or both the type of the aromatic polyetherketone resin and the type of the fluorine-containing copolymer were changed as shown in Table 1 (the composition ratio of the resin was further changed in Examples 3 to 5). Coating films and three-dimensionally printed articles were obtained under the same conditions as in Example 1, and the above evaluations were performed on the obtained coating films and three-dimensionally printed articles. Table 1 shows the results.

Comparative Examples 1 and 2

Powder compositions were prepared as in Example 1, except that the fluorine-containing copolymer was not used as shown in Table 1 (the type of the aromatic polyetherketone resin was further changed in Comparative Example 2). Coating films and three-dimensionally printed articles were obtained under the same conditions as in Example 1, and the above evaluations were performed on the obtained coating films and three-dimensionally printed articles. Table 1 shows the results.

Comparative Example 3 and 4

Powder compositions were prepared as in Example 1, except that the fluorine-containing copolymer was changed to PTFE or modified PTFE as shown in Table 1. Coating films and three-dimensionally printed articles were obtained under the same conditions as in Example 1, and the above evaluations were performed on the obtained coating films and three-dimensionally printed articles. Table 1 shows the results.

The powder compositions of Comparative Examples 3 and 4 contained PTFE or modified PTFE which cannot be melt-molded. Therefore, most of the PTFE dispersed particles of the powder compositions of Comparative Examples 3 and 4 fell off upon pulverization and failed to maintain the alloyed state, unlike the powder compositions obtained in Examples 1 to 7.

Modified PTFE refers to one containing one or more monomers excluding TFE in a total amount of less than 2 wt %.

Comparative Example 5

A powder composition was obtained as in Example 1, except that, as shown in Table 1, the aromatic polyetherketone resin was changed to polyphenylene sulfide. A coating film and a three-dimensionally printed article were obtained under the same conditions as in Example 1, and the above evaluations were performed on the obtained coating film and three-dimensionally printed article. Table 1 shows the results.

TABLE 1

| | | Example 1 | Example 2 | Example 3 | Example 4 | Example 5 | Example 6 | Example 7 |
|---|---|---|---|---|---|---|---|---|
| (1): Aromatic polyetherketone resin or polyphenylene sulfide | | 1 | 2 | 2 | 3 | 4 | 5 | 6 |
| (2): Fluorine-containing copolymer | | 1 | 1 | 1 | 2 | 2 | 3 | 1 |
| Properties of raw materials | (1)/(2) Compositional ratio (mass ratio) | 80/20 | 80/20 | 60/40 | 50/50 | 40/60 | 80/20 | 80/20 |
| | MFR of (1) (g/10 min) | 26 | 39 | 36 | 35 | 71 | 57 | 18 |
| | Melting point of (1) (° C.) | 331 | 336 | 336 | 301 | 301 | 360 | 340 |
| | Glass transition temperature of (1) (° C.) | 162 | 162 | 162 | 160 | 160 | 165 | 143 |
| | Average dispersed particle size r1 of (2) before MFR measurement (μm) | 0.32 | 0.28 | 0.34 | 0.62 | 1.68 | 0.88 | 0.32 |
| | Average dispersed particle size r2 of (2) after MFR measurement (μm) | 0.41 | 0.31 | 0.39 | 0.85 | 2.40 | 0.78 | 0.41 |

TABLE 1-continued

| | | | | | | | | | |
|---|---|---|---|---|---|---|---|---|---|
| | Average dispersed particle size ratio of (2) (r2/r1) | | 1.28 | 1.12 | 1.15 | 1.37 | 1.43 | 0.89 | 1.28 |
| Properties of powder | Particle size | D50 (μm) | 55 | 60 | 85 | 94 | 108 | 48 | 57 |
| | | D10 (μm) | 14 | 17 | 20 | 26 | 38 | 16 | 18 |
| | | D90 (μm) | 102 | 108 | 123 | 157 | 194 | 99 | 104 |
| | Angle of repose (°) | | 38 | 40 | 42 | 45 | 47 | 37 | 38 |
| Coating film | Surface smoothness | | A | A | B | B | B | A | A |
| | Impact strength | | A | A | A | A | B | A | A |
| | Abrasion loss (mg) | | 3 | 4 | 6 | 7 | 10 | 3 | 4 |
| Three-dimensionally printed article | Tensile elongation at break (%) | | 58 | 44 | 30 | 21 | 20 | 43 | 38 |
| | Charpy impact strength (kJ/$m^2$) | | 50 | 45 | 42 | 32 | 25 | 48 | 41 |

| | | | Comparative Example 1 | Comparative Example 2 | Comparative Example 3 | Comparative Example 4 | Comparative Example 5 |
|---|---|---|---|---|---|---|---|
| (1): Aromatic polyetherketone resin or polyphenylene sulfide | | | 1 | 7 | 1 | 1 | 8 |
| (2): Fluorine-containing copolymer | | | — | — | 4 | 5 | 1 |
| Properties of raw materials | (1)/(2) Compositional ratio (mass ratio) | | 100/0 | 100/0 | 80/20 | 80/20 | 80/20 |
| | MFR of (1) (g/10 min) | | 40 | 10 | 42 | 45 | 300 |
| | Melting point of (1) (° C.) | | 331 | 342 | 331 | 331 | 275 |
| | Glass transition temperature of (1) (° C.) | | 162 | 143 | 162 | 162 | 92 |
| | Average dispersed particle size r1 of (2) before MFR measurement (μm) | | — | — | 3.61 | 52 | 4.22 |
| | Average dispersed particle size r2 of (2) after MFR measurement (μm) | | — | — | 7.26 | 112 | 10.25 |
| | Average dispersed particle size ratio of (2) (r2/r1) | | — | — | 2.01 | 2.16 | 2.43 |
| Properties of powder | Particle size | D50 (μm) | 58 | 61 | 174 | 314 | 63 |
| | | D10 (μm) | 15 | 17 | 64 | 111 | 13 |
| | | D90 (μm) | 106 | 113 | 321 | 535 | 110 |
| | Angle of repose (°) | | 35 | 36 | 58 | 67 | 40 |
| Coating film | Surface smoothness | | A | A | C | C | C |
| | Impact strength | | C | C | B | B | C |
| | Abrasion loss (mg) | | 63 | 49 | 5 | 10 | Not measurable due to breakage of coating film |
| Three-dimensionally printed article | Tensile elongation at break (%) | | 5 | 4 | No elongation | No elongation | No elongation |
| | Charpy impact strength (kJ/$m^2$) | | 3 | 2 | 11 | 9 | 2 |

What is claimed is:

1. A powder composition comprising:
an aromatic polyether ketone resin (I); and
a fluorine-containing copolymer (II),
wherein the powder composition has a ratio r2/r1 of 1.60 or lower, wherein r1 represents an average dispersed particle size of the fluorine-containing copolymer (II) and r2 represents an average dispersed particle size of the fluorine-containing copolymer (II) after melt flow rate measurement at 380° C. and a load of 5000 g with 5-minute pre-heating in conformity with ASTM D1238.

2. The powder composition according to claim 1,
wherein the aromatic polyether ketone resin (I) and the fluorine-containing copolymer (II) have a ratio by mass (I):(II) of 99:1 to 30:70.

3. The powder composition according to claim 1,
wherein the aromatic polyether ketone resin (I) has a melting point of 300° C. to 380° C.

4. The powder composition according to claim 1,
wherein the aromatic polyether ketone resin (I) has a glass transition temperature of 130° C. to 220° C.

5. The powder composition according to claim 1,
wherein the fluorine-containing copolymer (II) has a melting point of 200° C. to 323° C.

6. The powder composition according to claim 1, further comprising an additive.

7. The powder composition according to claim 6,
wherein the additive comprises a fibrous filler (III).

* * * * *